Sept. 2, 1930.   W. C. PARMLEY   1,774,664
JOINT FOR CONDUITS
Filed March 18, 1926
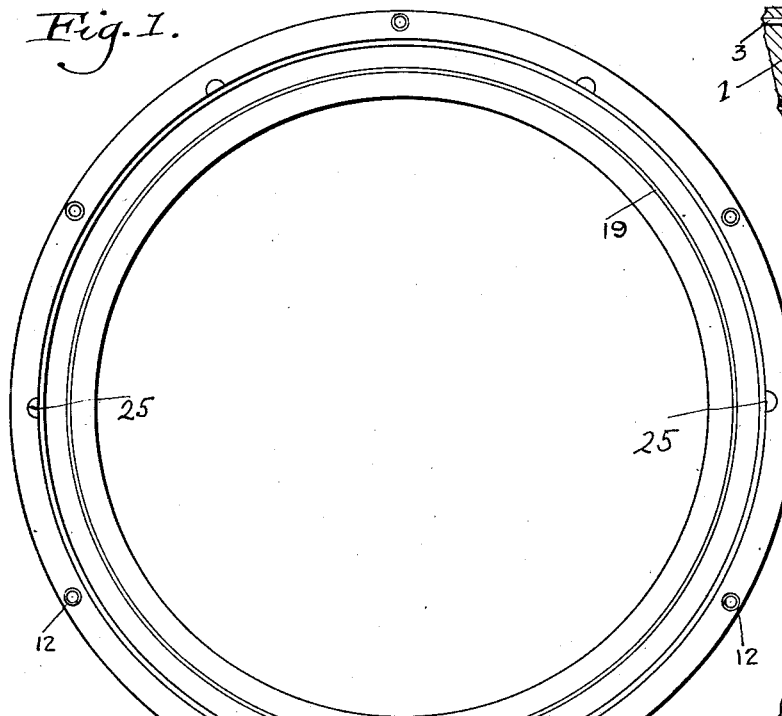
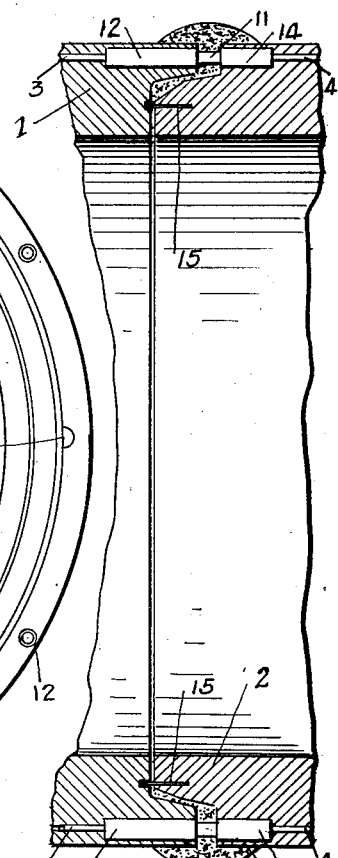
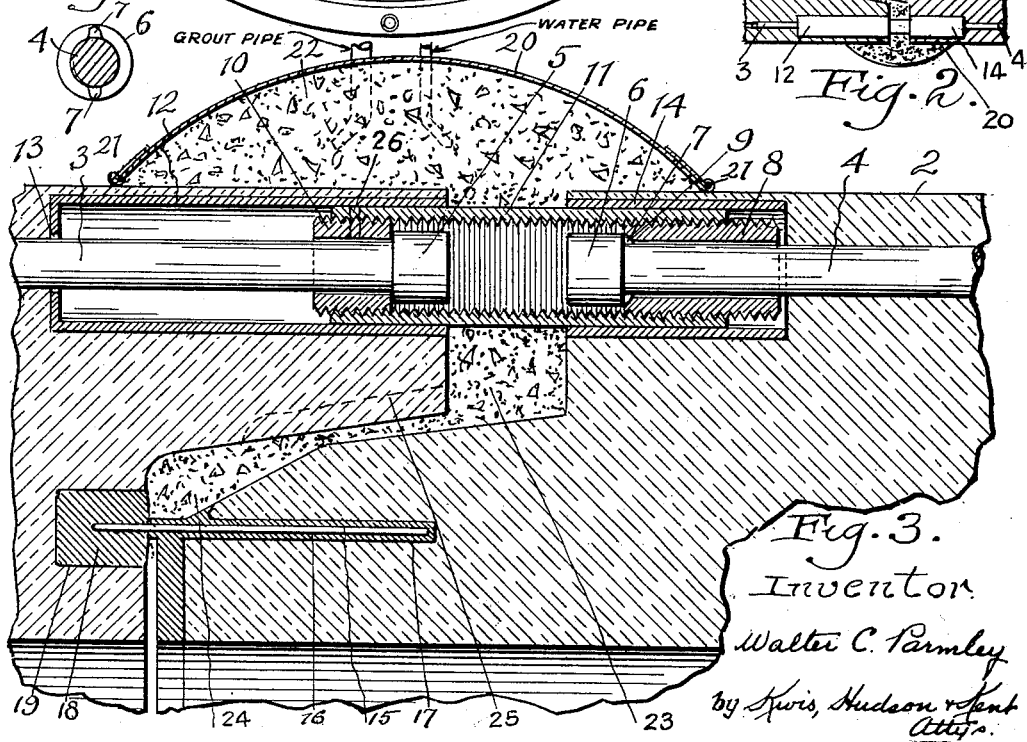
Fig. 3.
Inventor
Walter C. Parmley
by Kwis, Hudson & Kent
Attys.

Patented Sept. 2, 1930

1,774,664

UNITED STATES PATENT OFFICE

WALTER C. PARMLEY, OF UPPER MONTCLAIR, NEW JERSEY

JOINT FOR CONDUITS

Application filed March 18, 1926. Serial No. 95,539.

My invention relates to joints for concrete pipe sections, and the like, and has for its object to provide a joint which may be easily handled when these pipe sections are laid under water, as for instance on the bottom of the sea, or in wet ditches in city streets. In fact the joint is found to be of exceptional value in connecting sections of pipe together in case of subaqueous laying where a diver is required to make the connections under water.

A further object of the invention is to provide such a joint at the time the concrete pipe is molded so that the joint becomes a substantial part of the pipe itself.

It is further provided as an object, a means for protecting the parts of the joint at the time of the molding of the concrete pipes, said means being permitted to remain in the pipe sections after molding, and adapted to be used further in connection with the joining of the respective conduit sections of pipe.

As a further object of the invention I provide means on the joint which eliminates the use of more than one wrench in drawing the sections together and at the same time provide a means for drawing the sections together by means of the joint only.

This type of joint permits the sections to be partially joined together on the land and rolled or floated to the position where they are to be sunk, the remaining connections being made under water, or each connection can be made under water by a diver without difficulty and assuring a positive joint at substantially little cost. The efficiency and practicability of the joint is beyond question as has been shown by use in laying such sections of pipe.

Another object of the invention is to provide a protection for the joint so that salt water, and other water having characteristics causing corrosion, will not have any injurious effect on the joint.

The joint is further designed to permit flexibility so that the sections of the conduit may be easily assembled even though the various sections many not line up evenly.

With the objects above indicated and other objects hereinafter explained, in view, my invention consists in the construction and combination of elements hereinafter described and claimed.

Referring to the drawings:

Fig. 1 is an end view of the bell section of the pipe showing the arrangement of the joints.

Fig. 2 is a longitudinal sectional view of the bell and spigot end of the pipes showing the joints and the protecting means.

Fig. 3 is a segmentary sectional view of the bell and spigot ends of the pipes showing in detail the construction of the joints and the protective means.

Fig. 4 is an end view of the headed rod of the spigot end of the joint showing the lugs for preventing turning of the joint at one end.

In the drawings 1 indicates the bell end of a section of concrete pipe and 2 the spigot end of a section of pipe, each section of the pipe being provided with a bell end and a spigot end as shown on the drawings.

In constructing the joint shown, a rod is cut into proper lengths to allow for sufficiently embedding a portion of the rod within the concrete pipe. In casting the section of pipe the pipe is cast with the bell end 1 extending downwardly or to the bottom of the mold and the spigot end 2 extending upwardly or at the top of the mold.

The rod 3, which is one of the lengths of cut rod, is provided with a head 5 formed by a proper machine, such as an upsetting machine. An exteriorly screw-threaded sleeve 10 of sufficient length to furnish the necessary strength is inserted over the end of the rod 3 at the opposite end from the head 5. This sleeve 10 is permitted to slide freely upon the rod 3 and in fact the bore of the sleeve 10 is of sufficient diameter to permit substantial lateral movement of the sleeve relative to the rod but at the same time providing sufficient surface to abut the inner portion of the head 5.

To the outside of the sleeve 10 is attached an interiorly screw-threaded sleeve 11, the threads of which extend entirely through the sleeve and are adapted to engage with the screw-threads on the sleeve 10 to permit the adjustment therewith. The sleeve 11 when engaging all of the screw-threads on the sleeve 10 is adapted to extend substantially forward of the head 5.

A paper tubing 12, or tubing made of any other material which will disintegrate in time from moisture or water, which is closed at one end has an aperture 13 through the closed end of sufficient diameter to receive the rod 3. The fitting of the rod within this aperture should be very tight. This tube 12 is of sufficient depth to accommodate the sleeves 10 and 11 when the two sleeves are slid along the rod 3 so that no portions of the sleeves are projecting beyond the open end thereof. The inside diameter of tube 12 should be slightly larger than the outside of the sleeve 11.

Referring now to the connection of the spigot end 2 of the pipe, the rod 4, which may be continuous with a rod portion identical with that designated 3, is formed with a head 6 on one end in a manner similar to the aforementioned head 5 on rod 3. This rod is of sufficient length to permit a portion thereof to be securely embedded within the concrete forming the pipe. The head 6 of the rod 4 is provided with diametrically opposite lugs 7 on the rod side of the head, or the inner side. Two lugs 7 are shown in Fig. 4 but the number and location is not important as I may see fit to use a less number or a greater number and space them to the best advantage. An exteriorly screw-threaded sleeve 8 is adapted to slide loosely, as in the case of the sleeve 10 on the rod 3, on the rod 4, and upon one end of the sleeve, the end adapted to engage with the head 6, there are provided recesses 9 adapted to receive the lugs 7 of the head 6. It will be understood that these recesses will be located and correspond in number to the number and location of the lugs 7 on the head 6. The exterior screw-threads of this sleeve 8 are of the same gauge as the interior screw-threads of the outer sleeve 11 and the length of this outer sleeve 11 is such that a sufficient portion of the screw-threads of the sleeve 8 will be engaged by the sleeve 11 when the adjacent sections of the pipe are connected.

A paper tube 14 similar to the tube 12 is provided as a protection to the sleeve 8 and head 6 when the pipe is cast and although I have not shown one end enclosed, as it is not necessary in the present case, I can, however, use the same construction without interfering with the respective parts contained therein if necessary, as for instance, if the pipe should be cast with the spigot end down. This tube 14 should be of a length suitable to enclose the head 6 and the sleeve 8 and of an inside diameter greater than the outside diameter of the sleeve 11 to permit the sleeve to slide freely when the adjacent sections of the pipe are drawn together.

It will be noted from the foregoing description that each part of the joint is pocketed within the section of tubing and is, therefore, protected from injury or from the concrete forming the pipe sections.

As has been heretofore stated, in casting a section of the pipe the bell end extends downwardly and the spigot end upwardly.

In order to make the joint a part of the pipe, the tubing 12, which contains a portion of the rod 3, head 5 and the sleeves 10 and 11 is placed circumferentially upon, and near the outer edge of, the ring of the mold forming the bell end with the head 5 and the open end of the tube 12 resting on this ring. The concrete is then poured into the mold which forms itself around the tubing 12 and the portion of the rod 3 which extends through the end of the tubing, thereby securely holding the rod and tubing in the proper position. This same action takes place around each tube and rod and its has been found best to place these tubes on the 60° angle around the circumference.

In casting the pipe at the upper end of the bell opening a circumferential groove 19 is provided which will be hereinafter explained.

After these tubes have been surrounded with the concrete the pouring process is then continued until the section is built up to substantially the spigot end thereof. When the pipe has been built up sufficiently to accommodate the other tubes 14, they are placed circumferentially around the pipe on the 60° angle and corresponding to the position of the tubes 12. The rod 4 is then embedded to a proper depth and sufficiently to permit the head 6 to be enclosed within the upper end of the tube 14. As has been heretofore explained, the sleeve 8 is also adapted to be contained within the tube 14 to prevent injury to the threads on this portion of the joint. When these tubes are properly located the pouring is continued until the spigot end of the pipe is completed. A circumferential groove 17 is provided in the spigot end of the pipe, the center of this groove 17 registering substantially with the center of the groove 19 formed in the bell end, the purpose for which will be later explained. This completes the method of molding the respective parts of the joints within the pipe.

It is immaterial whether the tubes 12 and 14 are removed when the pipe is hard and dry as the paper will disintegrate due to the dampness after the sections are laid on the sea bottom or elsewhere. The paper tubes may, however, be dampened and removed if more play is needed in assembling the sections.

The circumferential groove 17 in the spigot end of the pipe is filled, after the concrete pipe has set, with plastic asphalt 16 and a layer of the asphalt is applied to the outer face of the spigot end. An iron ring 15, the cross section of which is less than that of the groove 17, is forced into this plastic asphalt before it is permitted to harden and a portion of the ring is adapted to extend outwardly beyond the face of the spigot end of the pipe. The plastic asphalt is likewise adapted to extend beyond the face of the spigot end of the pipe but it terminates before it reaches the end of the iron ring 15. The groove 19 is also filled with this plastic asphalt and designated 18, and allowed to set.

Attention is now directed to the method of connecting the various sections of pipe together. This may be done either under the water entirely by a diver, or the sections may be assembled on shore and portions floated to the proper location. In the assembling of portions on shore attention is called to the fact that only one joint is used at that time. In assembling, in either manner, however, the method of procedure is the same and it is hereinafter set forth.

The sections are placed in position with the various connections in substantial alignment. The sleeves 10 and 11 are withdrawn from the interior of the tube 12 until the sleeve 10 abuts the head 5 of the rod 3. The sleeve 11 is then inserted in the tube 14 until the threads of the sleeve 11 engage with the threads of the sleeve 8. The sleeve 11 is then rotated until a sufficient number of threads are engaged. During this operation the advanced section of pipe should be slightly raised to avoid interference of the iron ring 15 with the adjacent section of pipe. When the one joint has been drawn up tightly, and this is permitted due to the play allowed in the joint, the advanced section should be lowered. This, it will be noted, will cause the iron ring 15 to force itself into the plastic asphalt 18 in the groove 19 of the bell end of the pipe, thereby, automatically, sealing these two adjacent sections. After this sealing operation each of the joints may be drawn up tightly, as heretofore explained, in the same manner.

A space 23, between the two adjacent sections of pipe, is provided, the width of which is sufficient to permit a wrench to be applied for securely turning the sleeve 11 to cause the sections to be drawn closely together.

It will be noted that the sleeve 11 is permitted to turn freely on the rod 3 through the sleeve 10 these two being pinned together at 26 but the lugs 7 on the head 6 of the rod 4 engage the grooves 9 of the sleeve 8 and thereby prevent turning of said sleeve 8. This permits, however, the sleeve 11 to advance upon the sleeve 8 and by this construction it will be seen that I have avoided the necessity of using more than one wrench which is not avoided with the joints used at present and this materially helps in assembling the sections.

After the sections have been assembled, as hereinbefore pointed out, a surcingle of canvas is provided which extends entirely around the two sections of pipe and is of sufficient width to cover the joints. This surcingle of canvas 20 is maintained in place by wire 21 placed at the outer edges of the surcingle 20 and extends entirely around the sections and over the surcingle. It is then drawn tightly so as to hold the surcingle against displacement.

Cement is then forced by a pump or by gravity into this surcingle 20 to form a watertight housing 22 for the joint and the cement likewise finds its way into the chambers 23, 24 and the pockets 25 which are provided in the bell end of the pipe, thereby forming a positive joint between the adjacent sections. The cement is prevented from forcing itself into the interior of the pipes by the iron ring 15. As the cement has no way of escaping it is readily ascertainable when the pockets are filled to capacity by the swelling of the surcingle 20 and this surcingle may be filled with the cement until a sufficient thickness is obtained over the joint.

While I have described the preferred construction of my invention I am not to be understood as confining myself to this structure, as many changes may become apparent and necessary without departing from the spirit of the invention as contained in the claims.

It is to be further pointed out that by this construction described I have provided a leakproof joint through the arrangement of the ring 15. It should be noted that any change in temperature which would cause the joint to open up through contraction of the pipe or fail through expansion of the pipe would be cared for through the ring 15 which would be either further embedded in the plastic asphalt 19 or be somewhat withdrawn therefrom, and because of the nature of the plastic asphalt the joint would not leak.

Referring to the surcingle 20, as to the method of filling it with grout, it should be stated that this is effected by introducing the grout through a tube or pipe into the surcingle while the water therein is ejected or withdrawn through another tube or pipe communicating with the interior of the surcingle. By making these two operations simultaneously would prevent the grout becoming mixed with the salt water, or other water and thereby preventing the grout from becoming too thinned.

Having thus described my invention, I claim:

1. A joint for conduits and the like comprising concrete pipes having adjacent bell and spigot ends, means for drawing the adjacent ends together comprising sleeves extending axially of said pipes and engageable with adjacent portions of rods partially embedded in and bonding with the concrete of the said adjacent ends, said means lying wholly within the outer circumference of said pipes.

2. A joint for conduits and the like comprising concrete pipes having adjacent bell and spigot ends, longitudinal recesses in complementary flanges of said ends, headed rods embedded in said pipes and bonding therewith and projecting into said recesses, sleeves on said rods adapted to engage the heads, and means for drawing said sleeves toward each other.

3. A joint for conduits and the like comprising concrete pipes having bell and spigot ends, means for drawing the adjacent ends toward each other, an annular groove in the wall of the recess in said bell end, an annular groove in said spigot end, means in said grooves for sealing said adjacent ends, and a spaced portion between said ends adapted to be filled with a reinforcing media.

4. A joint for conduits and the like comprising concrete pipes having bell ends and spigot ends, means having portions embedded in said concrete for drawing the adjacent ends toward each other, means for protecting the exposed portions of said last mentioned means from said concrete, an annular recess in said bell end, an annular recess in said spigot end, means in said recesses for sealing said adjacent ends, a spaced portion between said ends, and means encircling the adjacent ends of said pipes for receiving a reinforcing media, said reinforcing media adapted to enter the spaced portion and abut said sealing means.

5. A joint for conduits and the like comprising concrete pipes having bell ends and spigot ends, means for drawing the adjacent ends together comprising members having portions embedded in said pipes and exposed ends with cooperating parts mounted thereon, means surrounding the exposed ends and said parts for protecting the same from the concrete, and means encircling the adjacent ends of said pipes adapted to receive a reinforcing media therein.

6. A joint for concrete and the like comprising concrete pipes having bell ends and spigot ends with recesses therein, means for drawing the adjacent ends together comprising cooperating members embedded in said adjacent ends and having portions projecting into said recesses, a circumferential pocket between the ends of the adjacent pipes, and a surcingle encircling the ends of the pipes and the pocket, said surcingle and pocket being adapted to receive concrete therein to rigidly join said ends.

7. A joint for concrete conduits and the like comprising cooperating ends of adjacent sections of the conduit, rods embedded in said sections and having portions extending into recesses formed in the ends of said sections, heads on said rods, sleeves on said rods adapted to abut against said heads, and means for drawing said sleeves and said sections toward each other.

8. A joint for concrete conduits and the like comprising cooperating ends of adjacent sections of the conduit, rods having portions thereof embedded in said sections, heads on said rods, sleeves on the exposed portions of said rods adapted to engage said heads, means for preventing rotation of one of said sleeves upon its rod, and means for drawing said sleeves toward each other to thereby move said sections with respect to each other.

9. A joint for concrete conduits and the like comprising cooperating ends of adjacent sections of the conduit, rods having portions thereof embedded in said sections, heads on the extended end of the rods, threaded sleeves on said rods adapted to engage said heads, and a third sleeve adapted to cooperate with said threaded sleeves for drawing said sections together.

10. A joint for concrete conduits and the like comprising cooperating ends of adjacent sections of the conduit, rods having portions thereof embedded in said sections, heads on the extended ends of the rods, threaded sleeves on said rods, a lug on one of said heads adapted to engage in a recess in one of said threaded sleeves, and a third sleeve adapted to cooperate with said threaded sleeves for drawing said sections together.

11. A joint for concrete conduits and the like comprising cooperating ends of adjacent sections of the conduit, rods having portions thereof embedded in said sections, heads on the extended ends of said rods, threaded sleeves mounted to permit longitudinal movement on said rods, and a third sleeve adapted to engage said threaded sleeves whereby rotation of said third sleeve moves said rods with respect to each other.

12. A joint for concrete conduits and the like comprising cooperating ends of adjacent sections of the conduit having recesses in said ends, sealing means disposed in said recesses, a sealing ring associated with said sealing means, rods having portions thereof embedded in said sections and having exposed ends, and means cooperating with the exposed ends of said rods to draw said sections together thereby pressing said ring into said sealing means.

In testimony whereof, I hereunto affix my signature.

WALTER C. PARMLEY.